US007801345B2

(12) United States Patent  
Fang et al.

(10) Patent No.: US 7,801,345 B2
(45) Date of Patent: Sep. 21, 2010

(54) METHOD OF QUANTIFYING ASYMMETRY OF AN OBJECT

(75) Inventors: Jing-Jing Fang, 12F, No. 296, Dong-An Rd., East Dist., Tainan (TW); Tung-Yiu Wong, No. 60, Alley 22, Lane 391, Pingfong Rd., Anping Dist., Tainan (TW); Tung-Chin Wu, Kaohsiung (TW)

(73) Assignees: Jing-Jing Fang, Tainan (TW); Tung-Yiu Wong, Tainan (TW)

( * ) Notice: Subject to any disclaimer, the term of this patent is extended or adjusted under 35 U.S.C. 154(b) by 1013 days.

(21) Appl. No.: 11/580,594

(22) Filed: Oct. 13, 2006

(65) Prior Publication Data

US 2007/0092126 A1 Apr. 26, 2007

(30) Foreign Application Priority Data

Oct. 17, 2005 (TW) .............................. 94136130 A (51) Int. Cl.
*G06K 9/00* (2006.01)
(52) U.S. Cl. ..................................................... 382/128
(58) Field of Classification Search ......... 382/128–132; 128/922; 345/429
See application file for complete search history.

(56) References Cited

U.S. PATENT DOCUMENTS

| 4,825,263 | A * | 4/1989 | Desjardins et al. | 356/603 |
| 5,467,785 | A * | 11/1995 | McCarty, Jr. | 128/898 |
| 6,533,418 | B1 * | 3/2003 | Izumitani et al. | 351/204 |
| 7,284,857 | B1 * | 10/2007 | Dahlem | 351/203 |
| 2006/0078172 | A1 * | 4/2006 | Zhang et al. | 382/118 |

OTHER PUBLICATIONS

Liu et al, Facial asymmetry quantification for expression invariant human identification, Computer Vision and Image Understanding 91 (2003) 138-159.*
X. Chen, P. Flynn, and K. Bowyer, "Fully automated facial symmetry axis detection in frontal color images," in Proc. IEEE Workshop Automatic Identification Advanced Technologies, pp. 106-111, Oct. 2005.*
Rass et al, Method for quantifying facial asymmetry in three dimensions using stereophotogrammetr, Department of Orthodontics, Academic Centre for Dentistry Amsterdam (ACTA), The Netherland, 1995.*
Wong et al, A novel method of quantifying facial asymmetry,International Congress Series, May 2005, pp. 1223-1226.*

(Continued)

*Primary Examiner*—Vu Le
*Assistant Examiner*—Andrae S Allison
(74) *Attorney, Agent, or Firm*—Alan Kamrath; Kamrath & Associates PA (57) ABSTRACT

The method is performed in a computer and includes acts of importing medical image data sets of an object, selecting regions of interest of the object in each medical image data set, processing the medical image data and constructing an optimal symmetry plane. The act of selecting the regions of interest of the object in each medical image data set defines the regions of interest of the object in each medical image data set and locates the regions of interest of the object in each medical image data set. The act of processing the medical image data executes an error equation and obtains optimal parameters of the optimal symmetry plane with a symmetry value. The act of constructing an optimal symmetry plane constructs an optimal symmetry plane with the obtained optimal parameters. Based on the discovered Optimal Symmetry Plane, slanted images from medical imaging can be rectified.

19 Claims, 11 Drawing Sheets

OTHER PUBLICATIONS

Hajeer et al, Three-dimensional assessment of facial soft-tissue asymmetry before and after orthognathic surgery, The British journal of oral maxillofacial surgery (2004) vol. 42, Issue: 5, Publisher: Elsevier, pp. 396-404.*

* cited by examiner

METHOD OF QUANTIFYING ASYMMETRY OF AN OBJECT

BACKGROUND OF THE INVENTION

1. Field of the Invention

The present invention relates to a quantitative asymmetry method and, particularly, to a method of quantifying asymmetry of an object. A symmetry value is developed from the quantified symmetry method. Based on the discovered Optimal Symmetry Plane (OSP), slanted images from medical imaging can be rectified.

2. Description of Related Art

Due to advancement in the medical field, medical images have become an important tool for pre-surgical planning for oral, maxillofacial, and plastic surgery. Medical imaging may be two-dimensional (2-D) or three-dimensional (3-D) images, and the images assist physicians in obtaining a full picture of the nidus of each individual patient. In addition, a symmetric face of an individual is much more attractive esthetically than an asymmetric face. However, a completely symmetric face is virtually impossible in nature.

In general, medical images are obtained by x-ray, ultrasound, Computer Tomography (CT) or Magnetic Resonance Imaging (MRI), and the obtained medical images are 2-D images. Furthermore, multiple 2-D images are used to construct a 3-D image, and using more 2-D images increase visual spatial realism of the 3-D image. A traditional method of constructing a symmetry plane of a 3-D image model for a surgeon is to manually draw an approximated central plane on the 3-D image model. The 3-D image is presumed to have a symmetry plane based on the central lines of the skull, and, further, the lateral half of the 3-D image is mirrored accordingly. That means the lateral half of the 3-D image is constructed based on the presumed symmetry plane generated from the processed 2-D images.

In general, the central symmetry line of one 3-D image model is determined subjectively by an individual surgeon. However, each patient is unique, and various parts of the body are asymmetric to varying extents. Further, each surgeon has a slightly different but distinct esthetic sense. Furthermore, a single surgeon may draw different central lines on the same medical image in different circumstances. Therefore, how to determine a unique, reasonable and reliable symmetry plane of a 3-D image model is crucial for plastic and maxillofacial surgery.

A few publications relate to determining symmetry of an object and are particularly applicable to digital images. Josef Bigun proposed a method to find the best symmetry region in certain patterns. Bigun's proposed method uses a symmetry equation and derives the best symmetry region by transforming the symmetry equation into a specific spectrum with a least square method. In another publication, Hagit Zabrodsky, Shmuel Peleg and David Avnir proposed an edge verification method to quantify the symmetry level of the object.

These methods described above are able to determine the symmetry of a specific object but require extensive and complex computations in data processing. Even though promoting computational performance during the determination of the symmetry of an object and developing a novel method to evaluate the degree of symmetry of an object are stated objectives in the field, actually obtaining a reliable and consistent degree of asymmetry is the key issue.

The present invention provides a way of quantitatively determining symmetry of an object to overcome the aforementioned problems.

SUMMARY OF THE INVENTION

The main objective of the invention is to provide a method of quantifying asymmetry of an object by locating an optimal symmetry plane associated with a symmetry value of the object in a 3-D medical image model. A symmetry value indicates the symmetry degree, or in another word, the asymmetry degree. The optimal symmetry plane helps medical personnel to correct slanted original images for successive multiple applications.

The method in accordance with the present invention is performed in a computer and comprises acts of importing medical image data set of an object, selecting regions of interest of the object in each medical image data set, processing the medical image data in each data set and constructing an optimal symmetry plane associated with a best symmetry value. The act of importing medical image data sets of an object imports multiple medical image data sets of an object into a computer. The act of selecting the regions of interest of the object in each medical image data set comprises steps of selecting contrast and threshold arguments and processing the image data sets. The step of selecting contrast and threshold arguments defines the regions of interest of the object in each medical image data. The step of processing the image data sets locates the regions of interest of the object in each medical image data set. The act of processing the medical image data executes an error equation and obtains parameters corresponding to the error equation. The act of constructing an optimal symmetry plane comprises constructing an optimal symmetry plane with a best symmetry value.

Other objectives, advantages and novel features of the invention will become more apparent from the following detailed description when taken in conjunction with the accompanying drawings.

DETAILED DESCRIPTION OF PREFERRED EMBODIMENT

Figure 1:
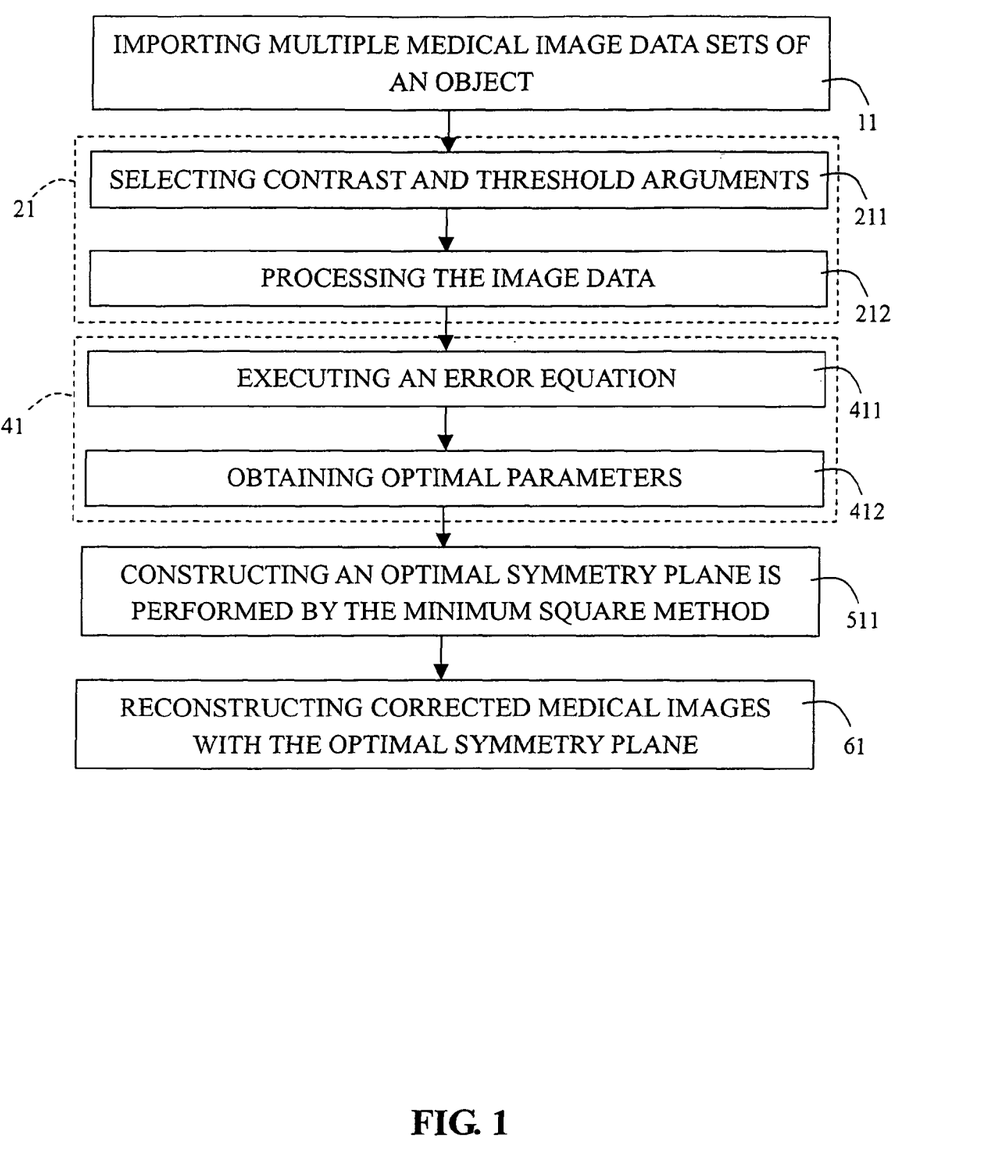
FIG. 1 is a functional block diagram of a first embodiment of a method for quantitatively determining symmetry of an object in accordance with the present invention.
Figure 2:
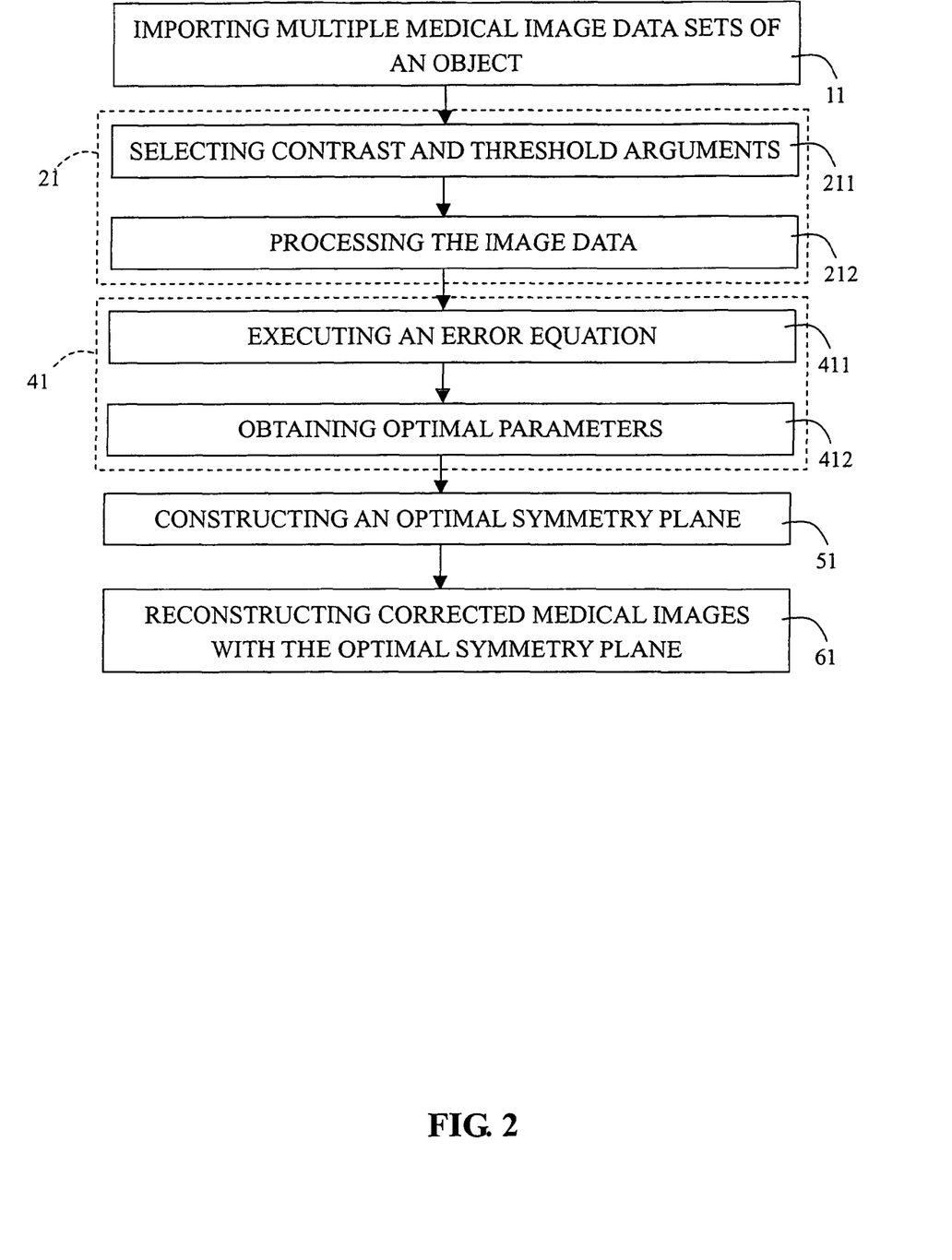
FIG. 2 is a functional block diagram of a second embodiment of a method for quantitatively determining symmetry of an object in accordance with the present invention.
Figure 3:
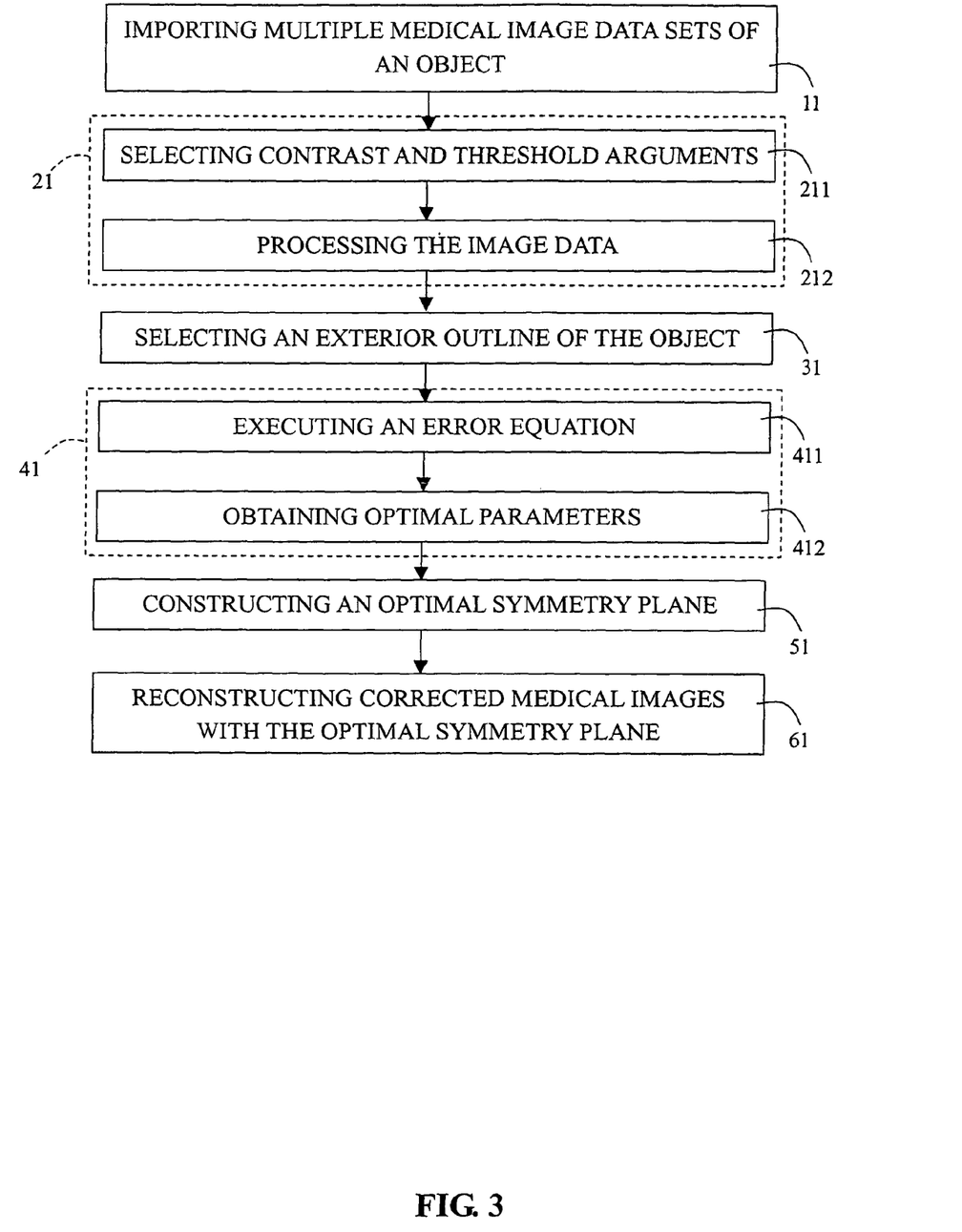
FIG. 3 is a functional block diagram of a third embodiment of a method for quantitatively determining symmetry of an object in accordance with the present invention.

With reference to FIGS. 1 to 3, a method of quantifying asymmetry of an object in accordance with the present invention is performed in a computer and comprises acts of importing multiple medical image data sets of an object, selecting regions of interest of the object in each medical image data set, optionally selecting an exterior outline of the object, processing the medical image data in each data set, constructing an optimal symmetry plane associated with a best symmetry value and optionally constructing a corrected medical image with the optimal symmetry plane.

The act of importing medical image data sets of an object (11) comprises importing multiple medical image data sets of an object into a computer. The medical image data sets may be obtained from computer tomography (CT), ultrasonic imaging, magnetic resonance imaging (MRI) or the like. The medical image data sets may be 2-D images or 3-D images of the object.

The act of selecting regions of interest of the object in each medical image data set (21) locates the regions of interest (ROI) of the object in each medical image data set and comprises steps of selecting contrast and threshold arguments (211) and processing the image data (212).

Figure 7:
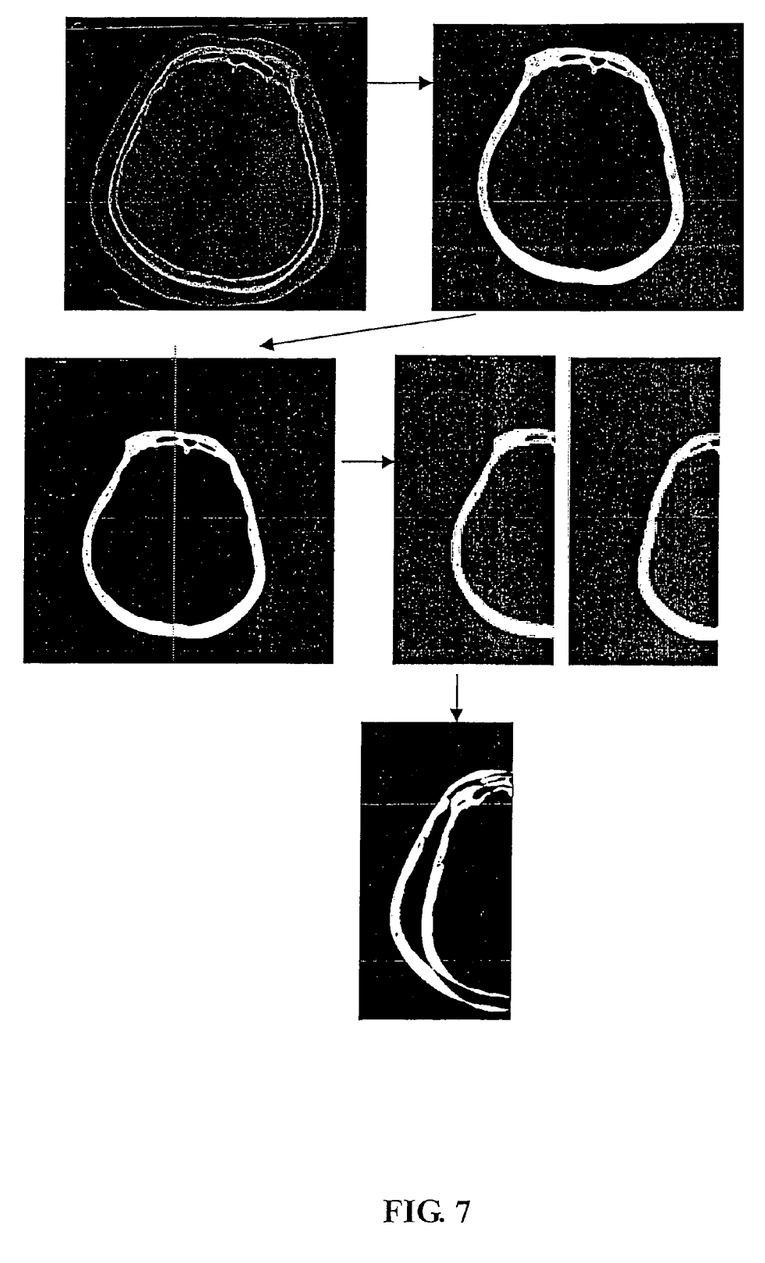
FIG. 7 is a series of medical charts used in the act of selecting the regions of interest of the object in medical image data and executing error function in FIG. 1.
Figure 8:
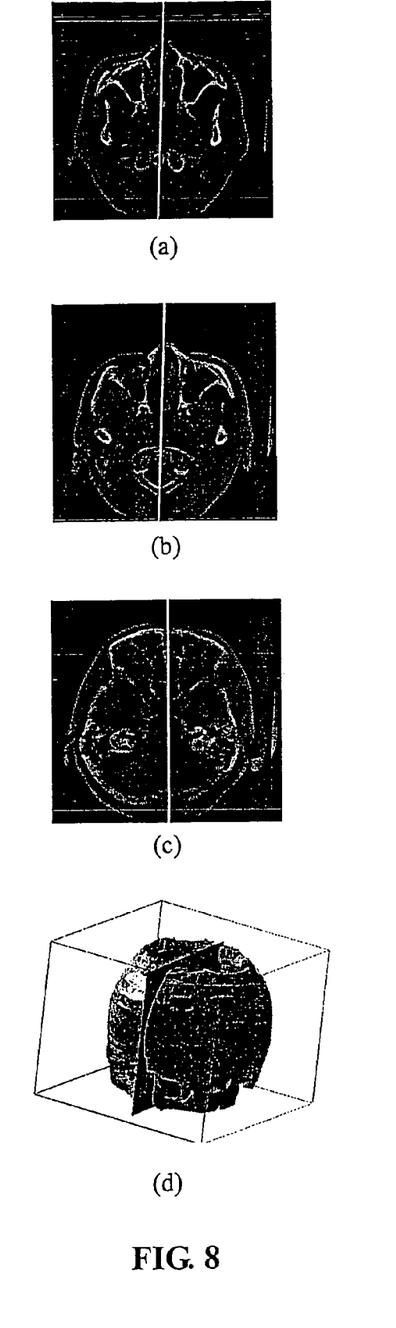
FIG. 8(a) is a first medical image of a skull split into two optimal symmetry pieces by the acts in FIG. 1.
FIG. 8(b) is a second medical image of the skull split into two optimal symmetry pieces by the acts in FIG. 1.
FIG. 8(c) is a third medical image of the skull split into two optimal symmetry pieces by the acts in FIG. 1.
FIG. 8(d) is a computer-generated image of the skull with an optimal symmetry plane constructed from FIGS. 8(a)-8(c) by the acts in FIG. 1.
Figure 9:
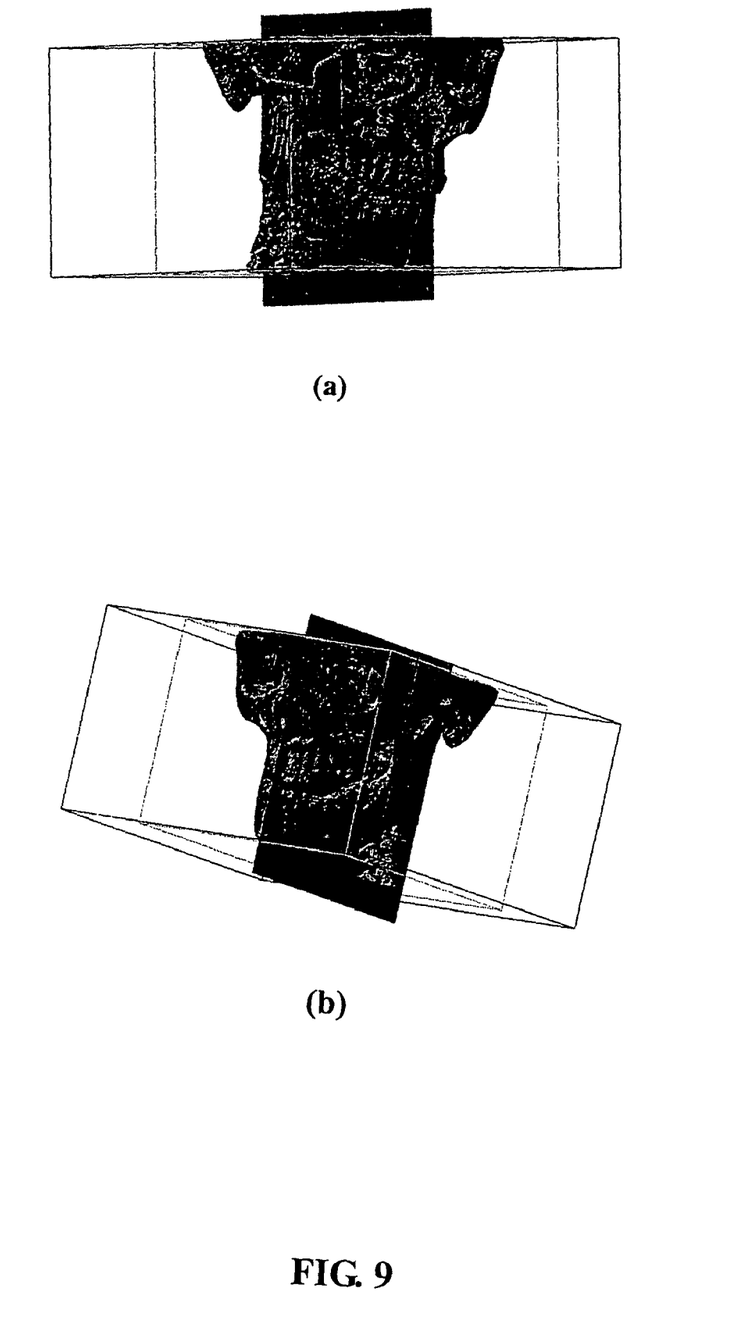
FIG. 9(a) is a computer-generated perspective view of an image of a skull with an optimal symmetry plane obtained by the acts in FIG. 2.
FIG. 9(b) is another computer-generated perspective view of the skull with the optimal symmetry plane in FIG. 9(a)

With further reference to FIGS. 7 to 9, the contrast and threshold arguments relate to gray scale gradations of the image data. For example, pixels or voxels of a 2-D or 3-D image data set obtained by CT may have 4096 gray levels. Further, the gray levels of human bones in the image data may be in the range of 1323-4095. Therefore, the contrast and threshold arguments used in determining human bones are in the range of 1323-4095.

The step of processing the image data (212) uses the contrast and threshold arguments to separate the pixels or voxels of the medical image data into two groups (i.e. those conforming and those not conforming to the contrast and threshold arguments). Further, the pixels or voxels conforming to the contrast and threshold arguments are the regions of interest of the object. Therefore, the regions of interest of the object in each medical image data set are located.

Figure 10:
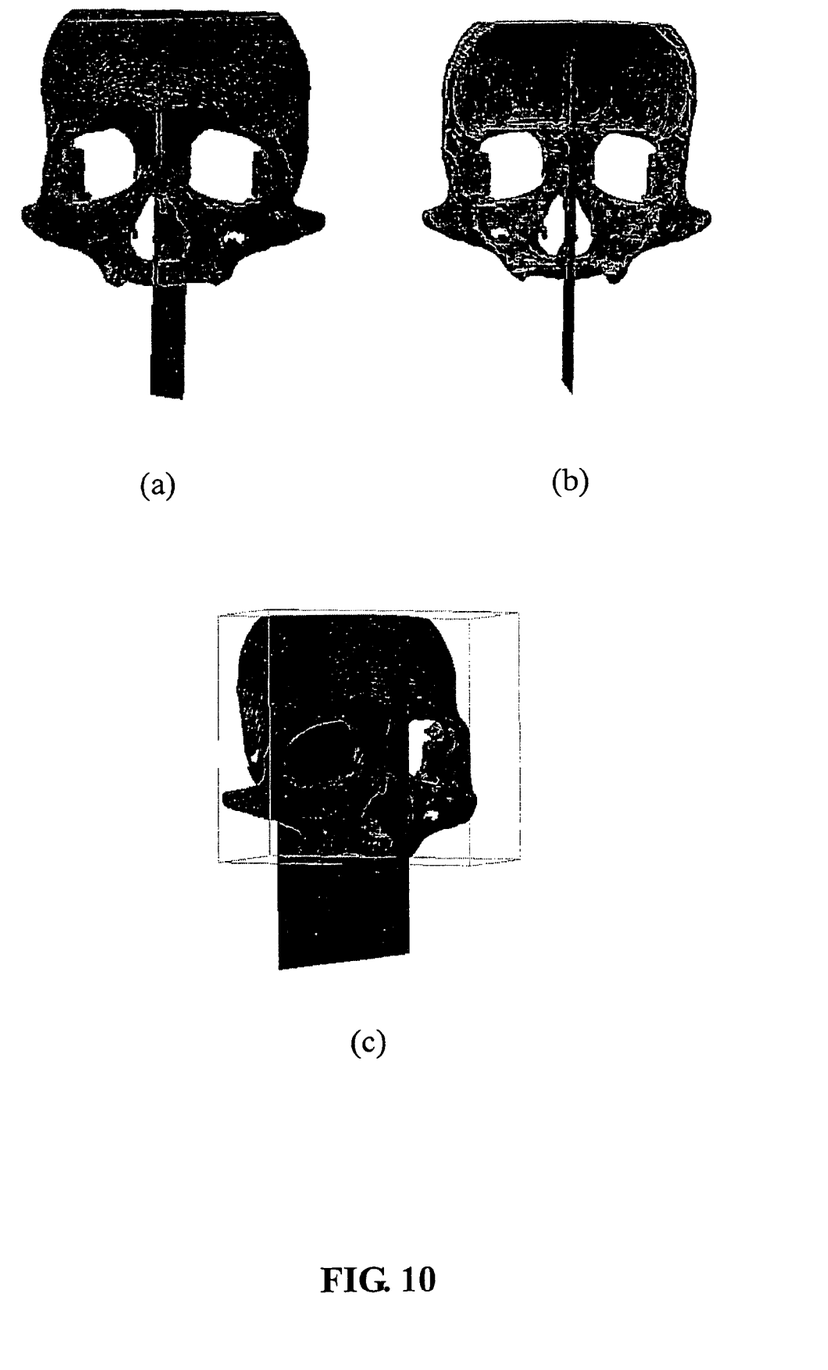
FIG. 10(a) is a computer-generated front view of a skull with an optimal symmetry plane obtained by performing the acts in FIG. 3.
FIG. 10(b) is a computer-generated rear view of the skull with the optimal symmetry plane in FIG. 10(a)
FIG. 10(c) is a computer-generated perspective view of the skull in FIG. 10(a)

With further reference to FIG. 10, the act of selecting an exterior outline of the object (31) comprises selecting the exterior outline of the object in the regions of interest by edge detection, such as the exterior outline of a skull.

The act of processing the medical image data in each data set (41) comprises steps of executing an error equation (411) and obtaining optimal parameters (412).

In the first embodiment, the error equation and the corresponding parameters are obtained as follows.

1. Suppose f(x, y) is a gray level equation of the object in the medical image data, and then assume that $L(\theta, c)=(\cos \theta)x+(\sin \theta)y+c=0$ is an symmetry line equation of the object in the medical image data, wherein $\theta$ represents an angle between the symmetry line $L(\theta,c)$ and the x-axis, and c is a constant.

2. If a pixel's coordinates are $(x_i, y_i)$ and the pixel's corresponding symmetric coordinates relating to the symmetry line $L(\theta,c)$ are $(x_{si}, y_{si})$, then $x_{si}=-\cos(2\theta)x_i-\sin(2\theta)y_i-2\cos(\theta)c$ and $y_{si}=-\sin(2\theta)x_i+\cos(2\theta)y_i-2\sin(\theta)c$. That is, if pixels exist such that $(x_i, y_i)=(x_{si}, y_{si})$, the symmetry line $L(\theta, c)$ is the optimal symmetry line of the object in the medical image data set.

3. The error equation is defined to be $$E(\theta, c) = \sum_{i=0}^{n-1} [f(x_i, y_i) - f(x_{si}, y_{si})]^2.$$

4. Because the step of processing the image data (212) separates the object in the medical image data into two groups, the error equation can be simplified to $$E(\theta, c) = \sum_{i=0}^{n-1} (f(x_i, y_i) \wedge f(x_{si}, y_{si})),$$

wherein $$f(x_i, y_i) \wedge f(x_{si}, y_{si}) = \begin{cases} 0, & f(x_i, y_i) = f(x_{si}, y_{si}) \\ 1, & f(x_i, y_i) \neq f(x_{si}, y_{si}). \end{cases}$$

Furthermore, a best symmetry value $E(\theta, c)$ is obtained when $\theta$ and c are the optimal parameters.

For example, a first embodiment of the method in accordance with the present invention analyzes a skull in a medical image data by first selecting and processing regions of interest in the medical image data set. With reference to FIG. 7, a symmetry line is assumed to split the skull into a left half part and a right half part. If the left half and right half parts can be optimally overlapped, the symmetry line is optimal. Further, the left half and right half parts split by the symmetry line are most symmetric. Therefore, the optimal parameters are $\theta$ and c and are substituted into the equation $L(\theta,c)$ of the symmetry line obtained in the step of operating an error equation (411). Therefore, the symmetry line with equation $L(\theta,c)$ is an optimal symmetry line.

In the first embodiment, the act of constructing an optimal symmetry plane (51) is performed by the minimum square method (511) as follows.

Figure 4:
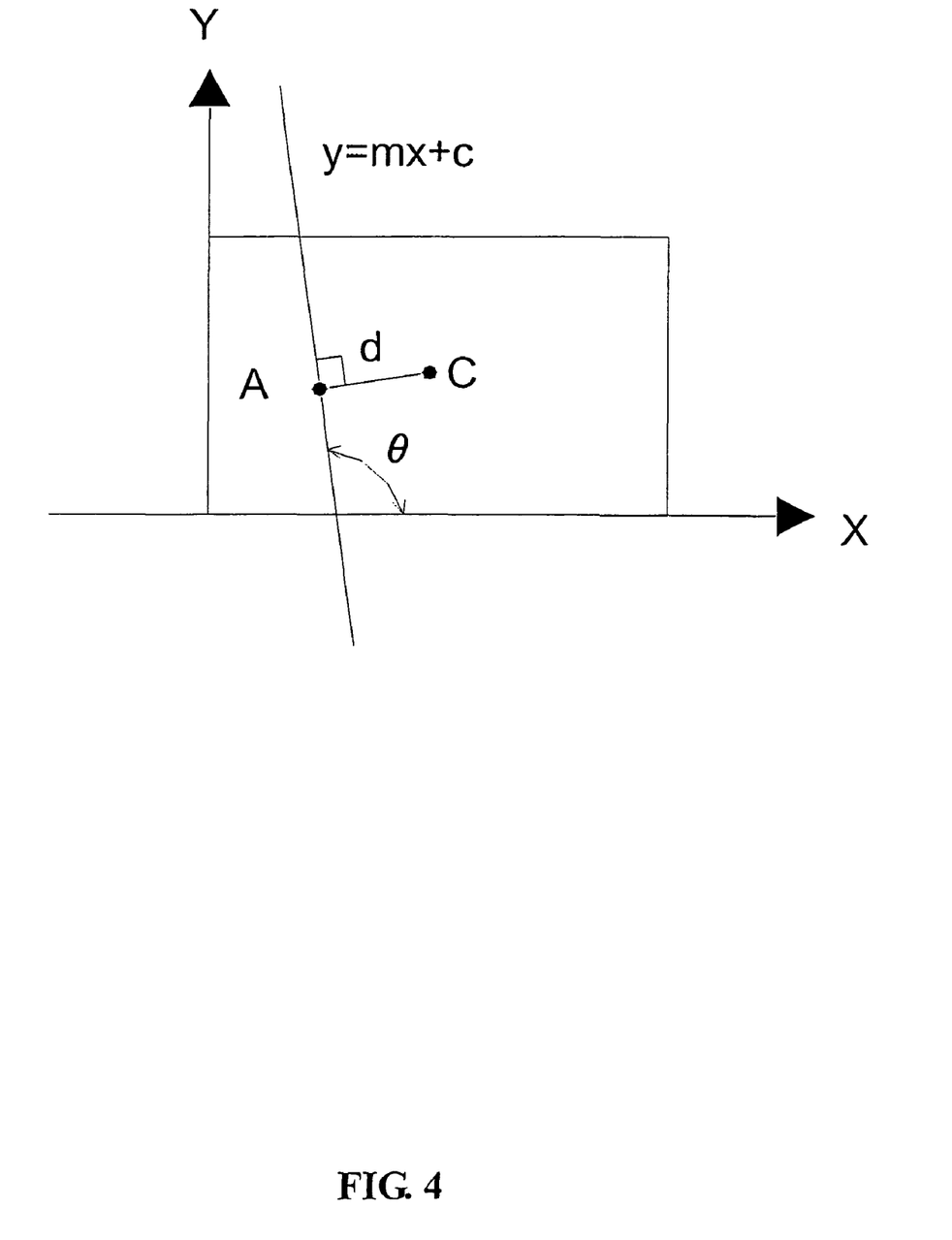
FIG. 4 is a plane diagram illustrating the act of constructing an optimal symmetry line on an image by using the minimum square method in FIG. 1.

1. With reference to FIG. 4, y=mx+c is the equation of the optimal symmetry line, d is the perpendicular distance between the optimal symmetry line and the center C of the object, and $\theta$ is the angle between the optimal symmetry line y and the x-axis.

2. Therefore, $A_x=C_x+d\sin(\theta)$, $A_y=C_y-d\cos(\theta)$ and $c=A_y-mA_x$.

3. An optimal symmetry plane is assumed to be y=ax+bz+c.

4. Let $$q = \sum_{i=1}^{n} [y_i - (ax_i + bz_i + c)]^2$$

When q approaches zero, q'(a,b,c)=0. Furthermore, $$\frac{\partial q}{\partial a} = \sum_{i=1}^{n} -2x_i(y_i - ax_i - bz_i) = 0,$$

$$\frac{\partial q}{\partial b} = \sum_{i=1}^{n} -2z_i(y_i - ax_i - bz_i) = 0$$

and $$\frac{\partial q}{\partial c} = \sum_{i=1}^{n} -2(y_i - ax_i - bz_i) = 0.$$

5. Therefore, the following equation is obtained.

$$\left(\sum_{i=1}^{n} x_i^2\right)a + \left(\sum_{i=1}^{n} x_i z_i\right)b + \left(\sum_{i=1}^{n} x_i\right)c = \left(\sum_{i=1}^{n} x_i y_i\right)$$

$$\left(\sum_{i=1}^{n} x_i z_i\right)a + \left(\sum_{i=1}^{n} z_i^2\right)b + \left(\sum_{i=1}^{n} z_i\right)c = \left(\sum_{i=1}^{n} z_i y_i\right)$$

$$\left(\sum_{i=1}^{n} x_i\right)a + \left(\sum_{i=1}^{n} z_i\right)b + (n)c = \left(\sum_{i=1}^{n} y_i\right)$$

6. Parameters a, b and c are eliminated with the Gauss elimination method to obtain an optimal symmetry plane.

With reference to FIGS. 8(a)-8(d), the skull in multiple medical image data obtained from doing CT is respectively split into two optimal symmetry pieces by an optimal symmetry line as previously described. After finishing the act of constructing an optimal symmetry plane (51), the optimal symmetry plane is composed of the multiple optimal symmetry lines.

In addition, the error equation and the optimal parameters in the second and third embodiments of the method in accordance with the present invention are obtained as follows.

1. f(x, y, z) is a gray level equation of the object in the medical image data set, and E(x, y, z)=ax+by+cz+d=0 is assumed to be a symmetry plane equation of the object in the medical image data set.

2. A pixel's coordinates are $(x_i, y_i, z_i)$ and the pixel's symmetric coordinates assumed to relate to the symmetry plane are $(x_{si}, y_{si}, z_{si})$. Therefore $$x_{si} = x_i - \frac{2a}{\sqrt{a^2 + b^2 + c^2}}(ax_i + by_i + cz_i + d),$$

$$y_{si} = y_i - \frac{2b}{\sqrt{a^2 + b^2 + c^2}}(ax_i + by_i + cz_i + d) \text{ and}$$

-continued $$z_{si} = z_i - \frac{2c}{\sqrt{a^2 + b^2 + c^2}}(ax_i + by_i + cz_i + d).$$

Figure 5:
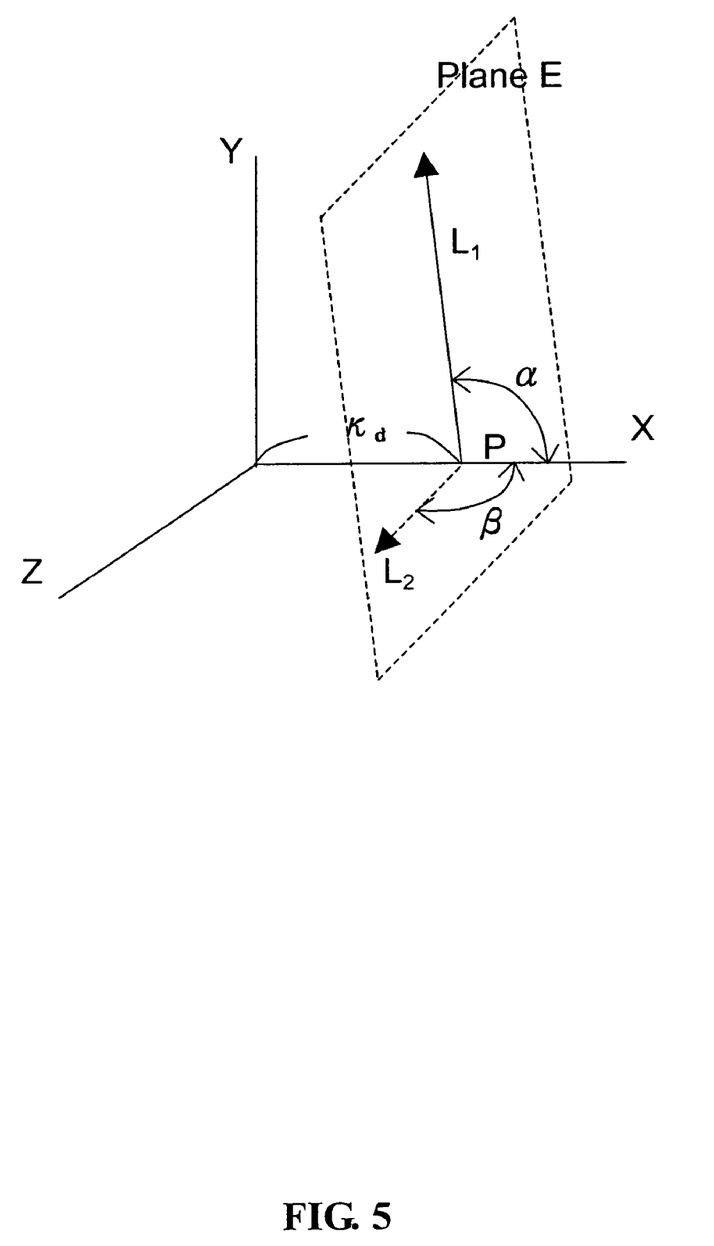
FIG. 5 is a plane diagram illustrating the act of constructing an optimal symmetry plane and its corresponding parameters in FIGS. 2 and 3.

3. With reference to FIG. 5, $L_1$ is an intersection line between plane E and plane XY, $L_2$ is an intersection line between plane E and plane XZ, point P is an intersection point between the x-axis and the plane E, α is an angle between $L_1$ and the x-axis, β is an angle between $L_2$ and the x-axis and $k_d$ is a distance between point P and the origin. Furthermore, the coordinates of point P are $(k_d,0,0)$, the direction vector of $L_1$ is (cos α, sin α, 0), the direction vector of $L_2$ is (cos β, 0, sin β) and the plane E has a vertical vector (cos α,sin α,0)*(cos β,0,sin β)=(sin α sin β,sin β cos β,cos β sin α).

4. Therefore, a=sin α sin β, b=sin β cos β, c=cos β sin α and d=$-k_d$(sin α sin β). Further, the plane E can be simplified to (sin α sin β)x+(sin β cos β)y+(cos β sin α)z–(sin α sin β)$k_d$=0.

5. The error equation is defined as $$E(\alpha, \beta, k_d) = \left(\sum_{i=0}^{n-1} [f(x_i, y_i, z_i) - f(x_{si}, y_{si}, z_{si})]^2\right) / n.$$

6. Because the step of processing the image data (212) separates the object in the medical image data into two groups, the error equation can be simplified into $$E(\alpha, \beta, k_d) = \left(\sum_{i=0}^{n-1} [f(x_i, y_i, z_i) \wedge f(x_{si}, y_{si}, z_{si})]\right) / n,$$

wherein $$f(x_i, y_i, z_i) \wedge f(x_{si}, y_{si}, z_{si}) = \begin{cases} 1, & f(x_i, y_i, z_i) = f(x_{si}, y_{si}, z_{si}) \\ 0, & f(x_i, y_i, z_i) \neq f(x_{si}, y_{si}, z_{si}) \end{cases}.$$

Furthermore, a best symmetry value $E(\alpha,\beta,k_d)$ is obtained when parameters α, β and $k_d$ are the optimal parameters.

In the second and third embodiments, the act of constructing an optimal symmetry plane (51) is performed as follows.

1. The optimal parameters α, β and $k_d$ are substituted into the equation (sin α sin β)x+(sin β cos β)y+(cos β sin α)z–(sin α sin β)$k_d$=0 of the symmetry plane obtained in the steps of executing an error equation (411) and obtaining the optimal parameters (412).

2. As the value of $f(x_i,y_i,z_i)^\wedge(x_{si},y_{si},z_{si})$ approaches 1, the plane E is closer to the optimal symmetry plane.

For example, the second and third embodiments of the method analyze a skull in a medical image data set and determine symmetry planes that pass through the symmetric center of the skull in the medical image data set.

Figure 6:
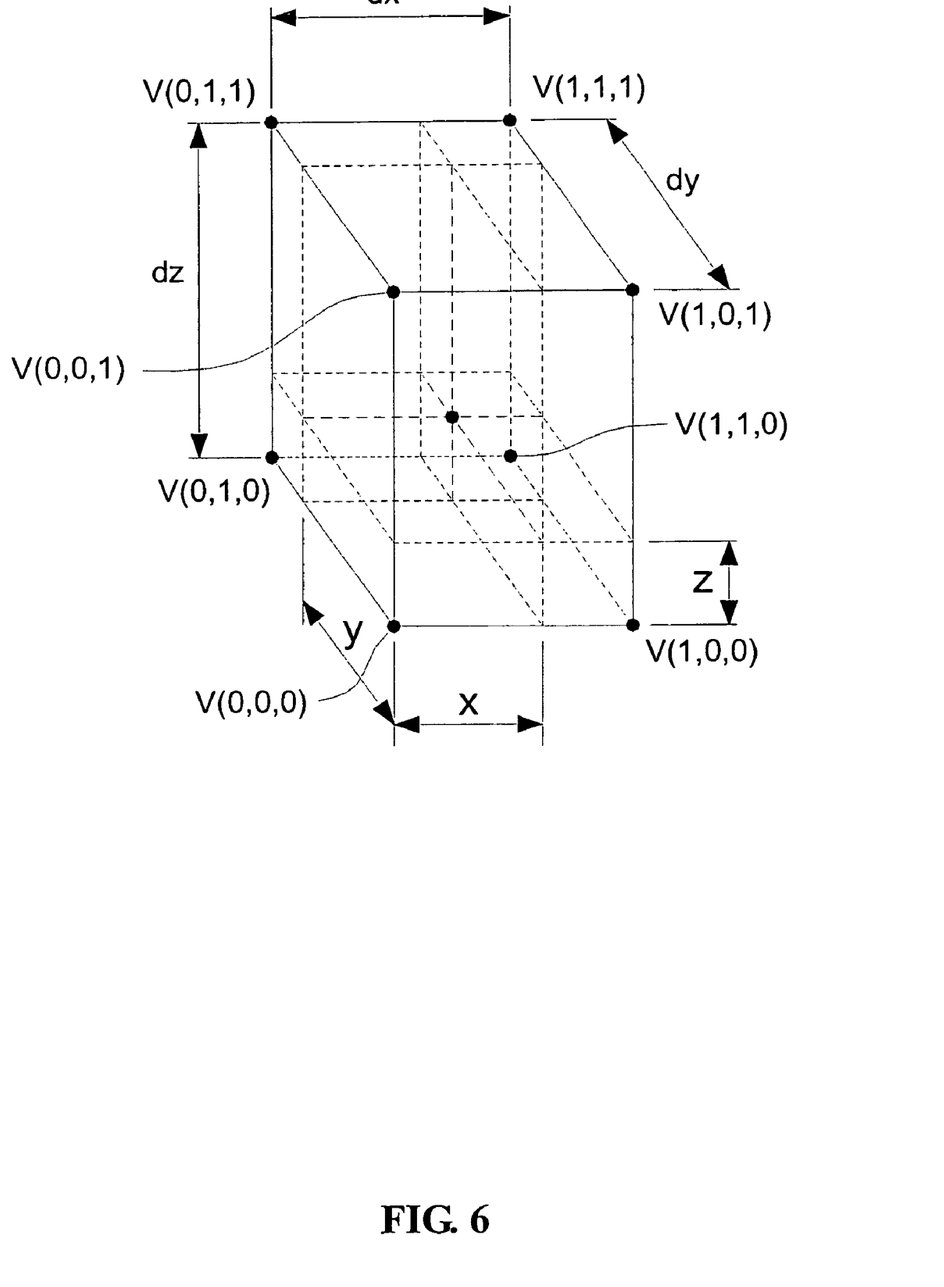
FIG. 6 is a diagram illustrating the act of voxel interpolation for medical image rectification in FIGS. 1, 2, and 3.

The act of reconstructing a corrected medical image with the optimal symmetry plane (61) is performed by an interpolation method. With reference to FIG. 6, the corrected medical image is reconstructed as follows.

1. G(x,y.z) is a gray level equation for a point having coordinates (x,y,z) after performing the interpolation method, and V(i,j,k) is a gray level equation for eight points adjacent to the point (x,y,z). The equation G(x,y.z) is $$G(x, y, z) = \sum_{i=0}^{1} \sum_{j=0}^{1} \sum_{k=0}^{1} V(i, j, k) \times Wx(k) \times Wy(j) \times Wz(i), \text{ wherein}$$

$$Wx(n) = \begin{cases} 1 - \dfrac{x}{dx} & \ldots \text{ if } n = 0; \\ \dfrac{x}{dx} & \ldots \text{ if } n = 1; \end{cases} \quad Wy(n) = \begin{cases} 1 - \dfrac{y}{dy} & \ldots \text{ if } n = 0; \\ \dfrac{y}{dy} & \ldots \text{ if } n = 1; \end{cases}$$

$$Wz(n) = \begin{cases} 1 - \dfrac{z}{dz} & \ldots \text{ if } n = 0; \\ \dfrac{z}{dz} & \ldots \text{ if } n = 1. \end{cases}$$

The equation G(x,y,z) can be used to obtain a gray level value of each point in a new slice plane. Therefore, the new slice plane can be computed as described above.

Figure 11:
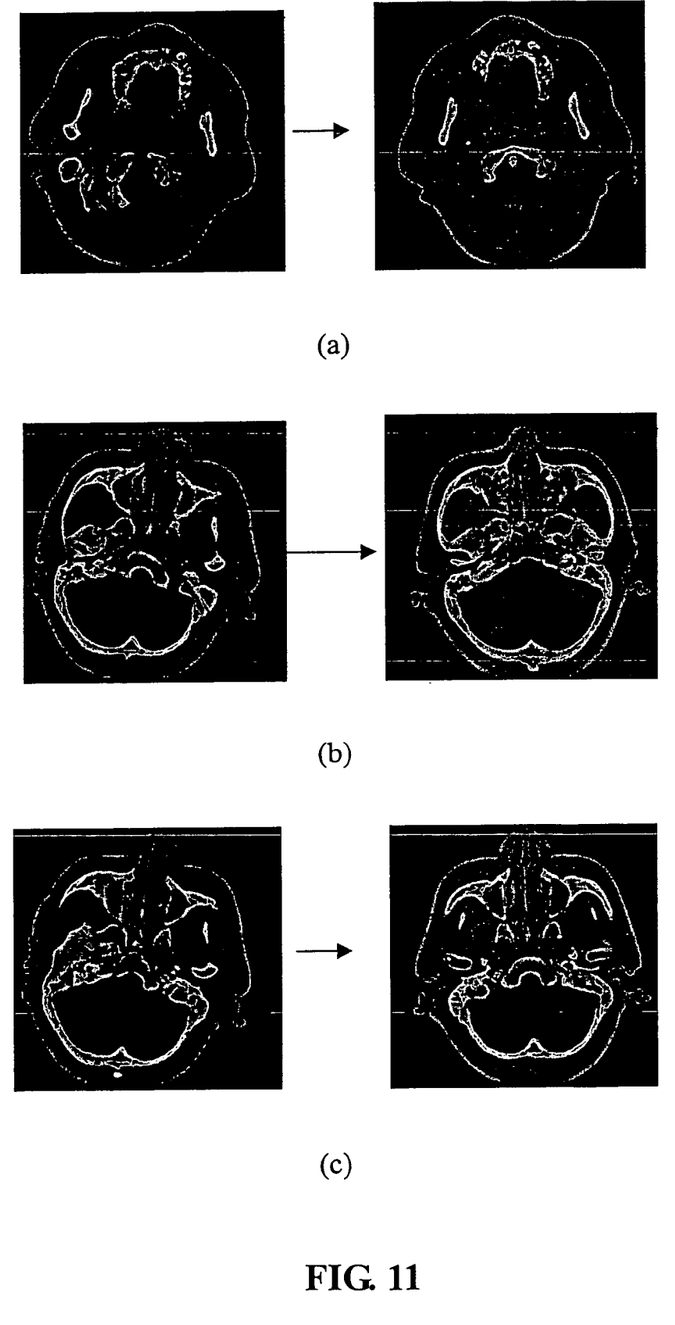
FIG. 11(a) is a medical image of a first slanted asymmetry object adjusted to a rectification image by the acts in FIG. 1.
FIG. 11(b) is a medical image of a second slanted asymmetric object adjusted to a rectification image by the acts in FIG. 2.
FIG. 11(c) is a medical image of a third slanted asymmetric object adjusted to a rectification image by the acts in FIG. 3.

With reference to FIGS. 11(*a*)-11(*c*), an asymmetric and slanted skull in the medical image data can be respectively corrected and re-sliced to be an optimal symmetry image with the first, the second and the third embodiments of the method.

Such a method helps people select a required part of an object in the medical image data set by inputting the least information to decrease computation time. Furthermore, the method executes an error equation to decrease the time to process and reconstruct the medical image data set. Therefore, people can obtain an optimal symmetry object as fast as possible. The method can assist medical personnel to correct the slanted original images more accurately and as fast as possible.

Even though numerous characteristics and advantages of the present invention have been set forth in the foregoing description, together with details of the structure and function of the invention, the disclosure is illustrative only. Changes may be made in detail especially in matters of arrangement of parts within the principles of the invention to the full extent indicated by the broad general meaning of the terms in which the appended claims are expressed.

What is claimed is:

1. A method of quantifying asymmetry of an object being operated in a computer and comprising acts of
    importing medical image data sets of an object into a computer;
    selecting regions of interest of the object in each medical image data set locating the regions of interest of the object in each medical image data set and comprising
        selecting contrast and threshold arguments defining the regions of interest of the object in each medical image data set; and
        processing the image data by using the contrast and threshold arguments to locate the regions of interest of the object in each medical image data set;
    processing the medical image data in each data set by executing an error equation and obtaining optimal parameters corresponding to the error equation; and
    constructing an optimal symmetry plane with a best symmetry value being a ratio value obtained from the error equation and comprising;
    $(\sin \alpha \sin \beta)x + (\sin \beta \cos \beta)y + (\cos \beta \sin \alpha)z - (\sin \alpha \sin \beta)k_d = 0$ being a symmetry plane of the object wherein parameters $\alpha$, $\beta$ and $k_d$ are obtained from the step of obtaining the optimal parameters, $\alpha$ is an angle between an x-axis and an intersection line between the symmetry plane and the plane XY, $\beta$ is an angle between the x-axis and an intersection line between the symmetry plane and the plane XZ and $k_d$ is a distance between a point on the symmetry plane and the origin; and
    obtaining the symmetry plane by substituting the optimal parameters $\alpha$, $\beta$ and $k_d$ into the equation $(\sin \alpha \sin \beta)x + (\sin \beta \cos \beta)y + (\cos \beta \sin \alpha)z - (\sin \alpha \sin \beta)k_d = 0$ of the symmetry plane.

2. The method as claimed in claim 1, wherein the act of processing the medical image data sets further comprising executing an error equation $$E(\alpha, \beta, k_d) = \left( \sum_{i=0}^{n-1} [f(x_i, y_i, z_i) \wedge f(x_{si}, y_{si}, z_{si})] \right) \Big/ n, \text{ wherein}$$

$$f(x_i, y_i, z_i) \wedge f(x_{si}, y_{si}, z_{si}) = \begin{cases} 1, & f(x_i, y_i, z_i) = f(x_{si}, y_{si}, z_{si}) \\ 0, & f(x_i, y_i, z_i) \neq f(x_{si}, y_{si}, z_{si}) \end{cases} ; \text{ and}$$

obtaining the optimal parameters $\alpha$, $\beta$ and $k_d$ by executing the error equation.

3. The method as claimed in claim 1, wherein the symmetry value is $$E(\theta, c) = \sum_{i=0}^{n-1} (f(x_i, y_i) \wedge f(x_{si}, y_{si})),$$

wherein $$f(x_i, y_i) \wedge f(x_{si}, y_{si}) = \begin{cases} 0, & f(x_i, y_i) = f(x_{si}, y_{si}) \\ 1, & f(x_i, y_i) \neq f(x_{si}, y_{si}) \end{cases}.$$

4. The method as claimed in claim 1, wherein the contrast and threshold arguments relate to gray scale gradations of the image data.

5. The method as claimed in claim 1 further comprising an act of selecting an exterior outline of the object, which selects the exterior outline of the object in the regions of interest by edge detection.

6. The method as claimed in claim 2 further comprising an act of selecting an exterior outline of the object, which selects the exterior outline of the object in the regions of interest by edge detection.

7. The method as claimed in claim 1 further comprising an act of reconstructing a corrected medical image with the optimal symmetry plane, which is performed with an interpolation method to correct slanted 2-D medical image data set.

8. The method as claimed in claim 2 further comprising an act of reconstructing a corrected medical image with the optimal symmetry plane, which is performed with an interpolation method to correct slanted 2-D medical image data set.

9. The method as claimed in claim 3 further comprising an act of reconstructing a corrected medical image with the optimal symmetry plane, which is performed with an interpolation method to correct slanted 2-D medical image data set.

10. The method as claimed in claim 4 further comprising an act of reconstructing a corrected medical image with the optimal symmetry plane, which is performed with an interpolation method to correct slanted 2-D medical image data set.

11. The method as claimed in claim 5 further comprising an act of reconstructing a corrected medical image with the optimal symmetry plane, which is performed with an interpolation method to correct slanted 2-D medical image data set.

12. A method of quantifying asymmetry of an object being operated in a computer and comprising acts of importing medical image data sets of an object into a computer;

selecting regions of interest of the object in each medical image data set locating the regions of interest of the object in each medical image data set and comprising selecting contrast and threshold arguments defining the regions of interest of the object in each medical image data set; and processing the image data by using the contrast and threshold arguments to locate the regions of interest of the object in each medical image data set;

processing the medical image data in each data set by executing an error equation and obtaining optimal parameters corresponding to the error equation; and constructing an optimal symmetry plane with a best symmetry value being a ratio value obtained from the error equation and comprising;

$L(\theta, c) = (\cos \theta)x + (\sin \theta)y + c = 0$ to be a presumed symmetry line of the object in the medical image data, wherein $\theta$ represents an angle between the symmetry line $L(\theta, c)$ and the x-axis, and c is a constant; and obtaining the symmetry plane by performing a minimum square method.

13. The method as claimed in claim 12, wherein the act of processing the medical image data sets further comprises executing an error equation $$E(\theta, c) = \sum_{i=0}^{n-1} (f(x_i, y_i)^\wedge f(x_{si}, y_{si})),$$

wherein $$f(x_i, y_i) \wedge f(x_{si}, y_{si}) = \begin{cases} 0, & f(x_i, y_i) = f(x_{si}, y_{si}) \\ 1, & f(x_i, y_i) \neq f(x_{si}, y_{si}) \end{cases}; \text{ and}$$

obtaining optimal parameters $\theta$ and c by executing the error equation.

14. The method as claimed in claim 12, wherein the symmetry value is $$E(\theta, c) = \sum_{i=0}^{n-1} (f(x_i, y_i)^\wedge f(x_{si}, y_{si})), \text{ wherein}$$

$$f(x_i, y_i)^\wedge f(x_{si}, y_{si}) = \begin{cases} 0, & f(x_i, y_i) = f(x_{si}, y_{si}) \\ 1, & f(x_i, y_i) \neq f(x_{si}, y_{si}) \end{cases}.$$

15. The method as claimed in claim 12, wherein the contrast and threshold arguments relate to gray scale gradations of the image data.

16. The method as claimed in claim 12 further comprising an act of reconstructing a corrected medical image with the optimal symmetry plane, which is performed with an interpolation method to correct slanted 2-D medical image data set.

17. The method as claimed in claim 13 further comprising an act of reconstructing a corrected medical image with the optimal symmetry plane, which is performed with an interpolation method to correct slanted 2-D medical image data set.

18. The method as claimed in claim 14 further comprising an act of reconstructing a corrected medical image with the optimal symmetry plane, which is performed with an interpolation method to correct slanted 2-D medical image data set.

19. The method as claimed in claim 15 further comprising an act of reconstructing a corrected medical image with the optimal symmetry plane, which is performed with an interpolation method to correct slanted 2-D medical image data set.

* * * * *